(12) United States Patent
Kerrigan et al.

(10) Patent No.: US 6,473,823 B1
(45) Date of Patent: Oct. 29, 2002

(54) METHOD AND APPARATUS FOR COMMON THIN-CLIENT NC AND FAT-CLIENT PC MOTHERBOARD AND MECHANICALS

(75) Inventors: Brian Michael Kerrigan; Roy Moonseuk Kim, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/323,232

(22) Filed: Jun. 1, 1999

(51) Int. Cl.[7] .............................................. G06F 13/00
(52) U.S. Cl. ....................... 710/301; 710/300
(58) Field of Search ................................ 710/300, 301; 439/928.1; 361/683, 728

(56) References Cited

U.S. PATENT DOCUMENTS 5,604,871 A * 2/1997 Pecone ....................... 710/300
6,138,089 A * 10/2000 Gunberman ................ 704/207

* cited by examiner

*Primary Examiner*—Xuan M. Thai
*Assistant Examiner*—Tim Vo
(74) *Attorney, Agent, or Firm*—J. Bruce Schelkopf; Andrew J. Dillon

(57) ABSTRACT

Components and circuitry, including a common microprocessor, are combined into a single motherboard that is common to both a Personal Computer (PC) and a Network Computer (NC). The motherboard is capable of receiving a riser card. Riser cards specific to either a NC or a PC are designed to provide functions that are not present on the common motherboard. Connector slots such as Integrated Drive Electronics (IDE), Industry Standard Architecture (ISA) and Peripheral Component Interconnect (PCI) are available on a PC riser card to accommodate additional circuit boards. Devices such as a hard drive, CD ROM drive, etc., may be installed utilizing appropriate connectors on a PC specific riser card that are not required or available on the NC. A riser card for the NC will accommodate a compact flash card connector or various other expansion cards that provide functions specific to the NC.

15 Claims, 5 Drawing Sheets

METHOD AND APPARATUS FOR COMMON THIN-CLIENT NC AND FAT-CLIENT PC MOTHERBOARD AND MECHANICALS

BACKGROUND OF THE INVENTION

1. Technical Field

The present invention relates in general to a data processing system (also referred to as a computer) and in particular common hardware architecture in a thin-client Network Computer (NC) and a fat-client Personal Computer (PC). More particularly, the present invention relates to development and manufacture of thin-client NCs and personal computers.

2. Description of the Related Art

A Network Computer™ (NC), a trademark of Sun Microsystems, Inc. of Palo Alto, Calif., is a "bare bones" Personal Computer (Pc) generally lacking a hard drive, a floppy drive and any other memory storage devices. The NC is a type of "thin-client," which may include a network communications card and may be used to run applications on a corporate intranet or browse the Internet. A "thin-client" (a minimally configured PC designed so that the bulk of the data processing occurs on a server) as used on the Internet is usually referred to as a NetPC and is reliant on a server provided by an Internet service provider. Generally, the bulk of applications and information necessary for the proper operation of any thin-client is available on the server, a configuration which is akin to a dumb terminal connected to a mainframe computer. The primary advantage of a thin-client NC is the low cost of ownership which includes initial cost and maintenance and support costs.

A PC contains the non-volatile storage and other components that are absent in a thin-client NC. For instance, additional parts required to complete a PC that are absent from a thin-client NC, include storage media such as: a hard drive, a CD Rom drive, removable storage drive, etc. The thin-client NC (also referred to as NC) has no use for these devices as programming and storage are provided by a network server. Just as there are different levels of power and complexity on a PC, there are different levels of NC. Typically, a "high end" (computing power) NC would be equivalent to a "low end" PC. Manufacturing costs and development of the PC and NC are very different, requiring different development and production groups.

In general, development on each type of computer is separately executed by different development groups. Even though many costs are the same, there are enough different costs to maintain different development groups for the NC or PC. There are many common electronic and mechanical parts but, as stated, the development and production of high end NCs and low end PCs are accomplished in different development areas and production lines. Though thin-client NCs and "fat-client" PCs share many common components, the space required by PCs for media bays for Floppy, CDROM and Hard drives is not necessary for thin-client NCs. NCs do not use locally attached storage and program media because the storage and program media is provided by a network server.

Referring to FIG. 4, a high-level flow diagram of a representative method for designing, developing and producing NC and PC data processing systems, is illustrated. The process for building/manufacturing a PC or a NC is roughly the same process. However, the design and production of each system are different enough to require two groups of design and manufacturing entities. Because the design groups are different the resulting products are different. The NC process begins with step 400, which depicts the NC design process determining an upgrade or new design for the NC. There are other design areas, but the motherboard of the NC will be highlighted here. The process proceeds to step 402, which illustrates design or redesign of the NC motherboard. The process next passes to step 404, which depicts manufacturing the motherboard (the other parts of the NC are also manufactured or provided for assembly to the motherboard and frame).

The process then proceeds to step 406, which illustrates the NC frame being assembled, onto which the NC motherboard is installed on the production line. The process continues to step 408, which depicts installing the various expansion cards required for the specific configuration of NC system. Next, the process proceeds to step 410, which illustrates installing a NC enclosure onto the NC frame and completing production of the NC system. The process next passes to step 412, which depicts the completed product being boxed and prepared for shipping.

As stated above, the NC and PC system design and manufacturing process are roughly the same, but they are accomplished in different locations. The PC process begins with step 420, which depicts the PC design team determining an upgrade or new design for the PC. There are other design areas, but the motherboard of the PC is highlighted here. The process proceeds to step 422, which illustrates design or redesign of the PC motherboard. The process next passes to step 424, which depicts manufacturing the motherboard (the other parts of the PC are also manufactured or provided for assembly to the motherboard and frame).

The process then proceeds to step 426, which illustrates the PC frame being assembled, onto which the PC motherboard is installed on the production line. The process continues to step 428, which depicts installing the various expansion cards required for the specific configuration of PC system. Next, the process proceeds to step 430, which illustrates installing a PC enclosure onto the PC frame and completing production of the PC system. The process next passes to step 432, which depicts the completed product being boxed and prepared for shipping.

As illustrated by FIG. 4, the design and manufacturing processes are similar with many common parts and assembly processes. With systems being so similar, effort is duplicated in many areas of the design, development and production of both the NC and the PC computers. Mechanical design of both PCs and NCs have been handled separately, usually solving the same problems independently. Resources are limited in both mechanical design skills and time. It would therefore, be desirable to provide a common motherboard that would accommodate either a low end PC or a high end NC. It would also be desirable to provide a common enclosure for the motherboard that would allow modular NC or PC enclosure additions to provide a complete enclosure. It would further be desirable to provide common development criteria for a low end PC and a high end NC. It would also be desirable to reduce design, development and manufacturing cost of both PC and NC.

SUMMARY OF THE INVENTION

It is therefore one object of the present invention to provide a method and apparatus that will provide a common motherboard for a PC and a NC.

It is another object of the present invention to provide a method and apparatus for developing common electronic and mechanical components of a NC and a PC.

It is another object of the present invention to provide a method and apparatus for reducing cost of development, manufacturing and material for a NC and a PC.

The foregoing objects are achieved as is now described. Components and circuitry, including a common microprocessor, are combined into a single motherboard that is common to both a Personal Computer (PC) and a thin-client Network Computer (NC). The motherboard is capable of receiving a riser card. Riser cards specific to either a NC or a PC are designed to provide functions that are not present on the common motherboard. Connector slots such as Integrated Drive Electronics (IDE), Industry Standard Architecture (ISA) and Peripheral Component Interconnect (PCI) are available on a PC riser card to accommodate additional circuit boards. Devices such as a hard drive, CD ROM drive, etc., may be installed utilizing appropriate connectors on a PC specific riser card that are not required or available on the NC. A riser card for the NC will accommodate a compact flash card connector or various other expansion boards that provide functions that are be specific to the NC.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
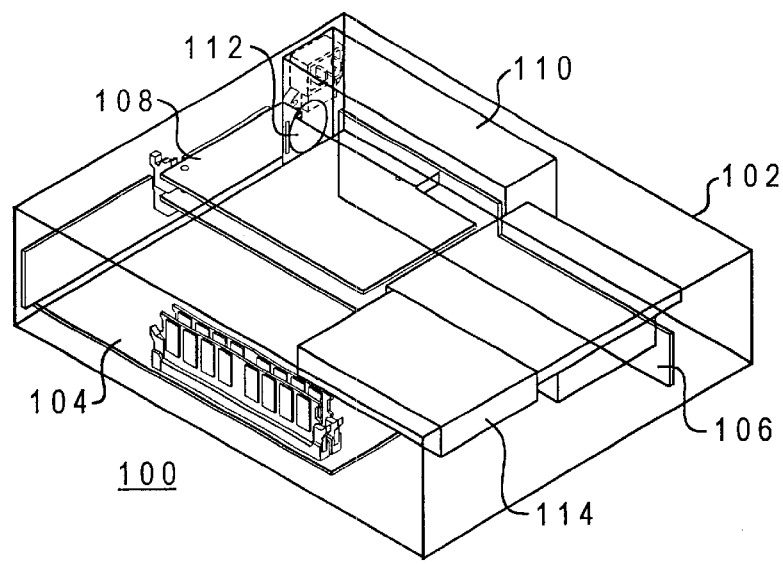
FIG. 1A depicts a phantom view of a PC in which a preferred embodiment of the present invention may be implemented.
Figure 1A:
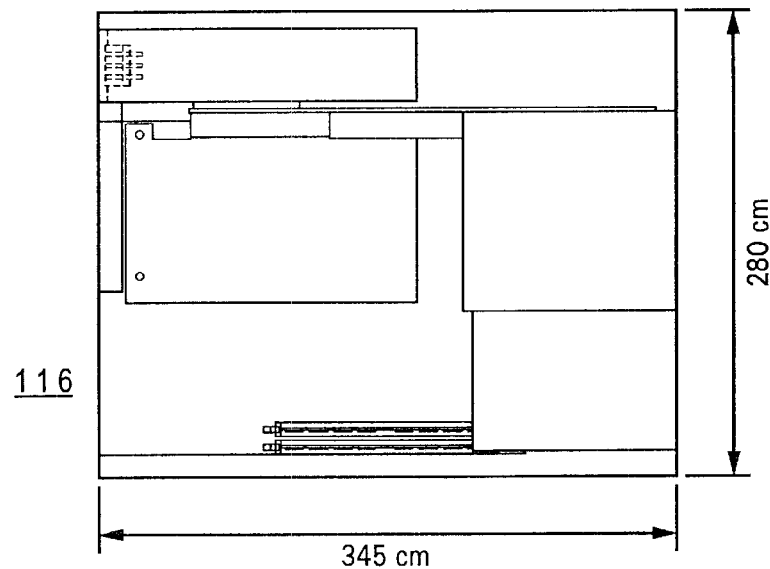
Figure 1A:
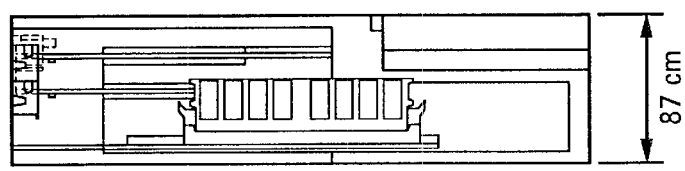
Figure 1A:
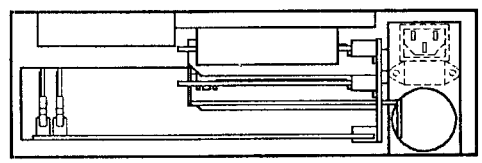

With reference now to the figures, and in particular with reference to FIG. 1A, a phantom perspective view of a Personal Computer (PC) in which a preferred embodiment of the present invention may be implemented, is depicted. PC 100 is shown including enclosure 102, motherboard 104, PC riser card 106, PCI cards 108 and power supply 110. Top view 116, side view 118 and front view 120 are also shown. As illustrated, PC riser card 106 is specific to PC 100 and though it may contain circuitry and components that are common to a NC, some of the circuitry and components are specific only to PC 100. PC riser card 106 is connected to motherboard 104 by an edge connector (not shown). However, PC riser card 106 may be fabricated for connection to motherboard 104 utilizing any known card connection means such as a motherboard mounted slot, or cable connector.

Cards 108 are inserted into slots (not shown) that are installed on PC riser card 106 including a modem card, Local Area Network card, graphics card, etc. Power supply 110 is mounted to the side and in the rear of PC 100 with power supply 110 cooling fan connected to ventilation port 112. Removable Media Bay 114 is shown containing three components and depending on the configuration may include floppy drives, hard drives, CD-ROM drive, etc. Removable Media Bay 114 provides connecting plugs (not shown) for connection to PC internal expansion cards and integrated circuitry.

Figure 1B:
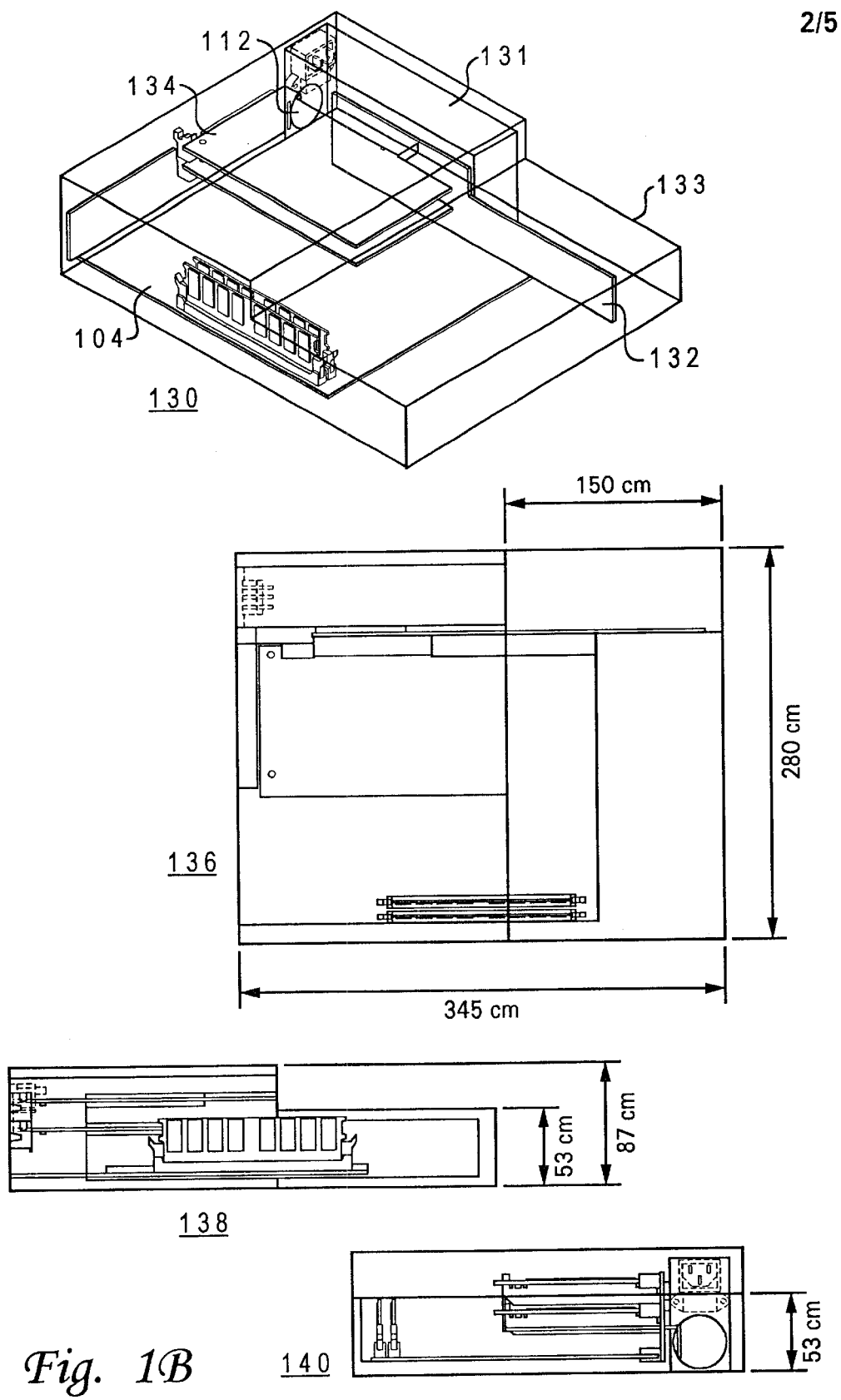
FIG. 1B is a phantom view of a NC in which a preferred embodiment of the present invention may be implemented.

Referring to FIG. 1B, a phantom view of a NC in which a preferred embodiment of the present invention may be implemented, is illustrated. Common components with the PC are shown including, motherboard 104 and frame on which motherboard 104 is mounted. Ventilation port 112 would be the same. It is likely that NC power supply 131 would be of less capacity, though it may not have smaller physical dimensions. Though NC riser card 132 is shown utilizing an edge connector, NC riser card 132 may be fabricated for connection to motherboard 104 utilizing any known card connection means such as a motherboard mounted slot, or cable connector.

Enclosure 133 compared to the PC enclosure provides a lower front profile (desirable for thin-client aesthetics) as there is no need for media drives or other storage. Side view 138 illustrates a lower front profile of the NC—in this instance, a 53 cm height compared to an 87 cm height of the PC. A commonality of major components between PC and NC including a common frame, common motherboard and common riser card connecting means facilitates development and production, which reduces cost. Expansion cards 134 are usually communication cards such as an ethernet card, modem card, graphics card for display or any card specific to a NC. Top view 136, side view 138 and front view 140 are also depicted.

Figure 2:
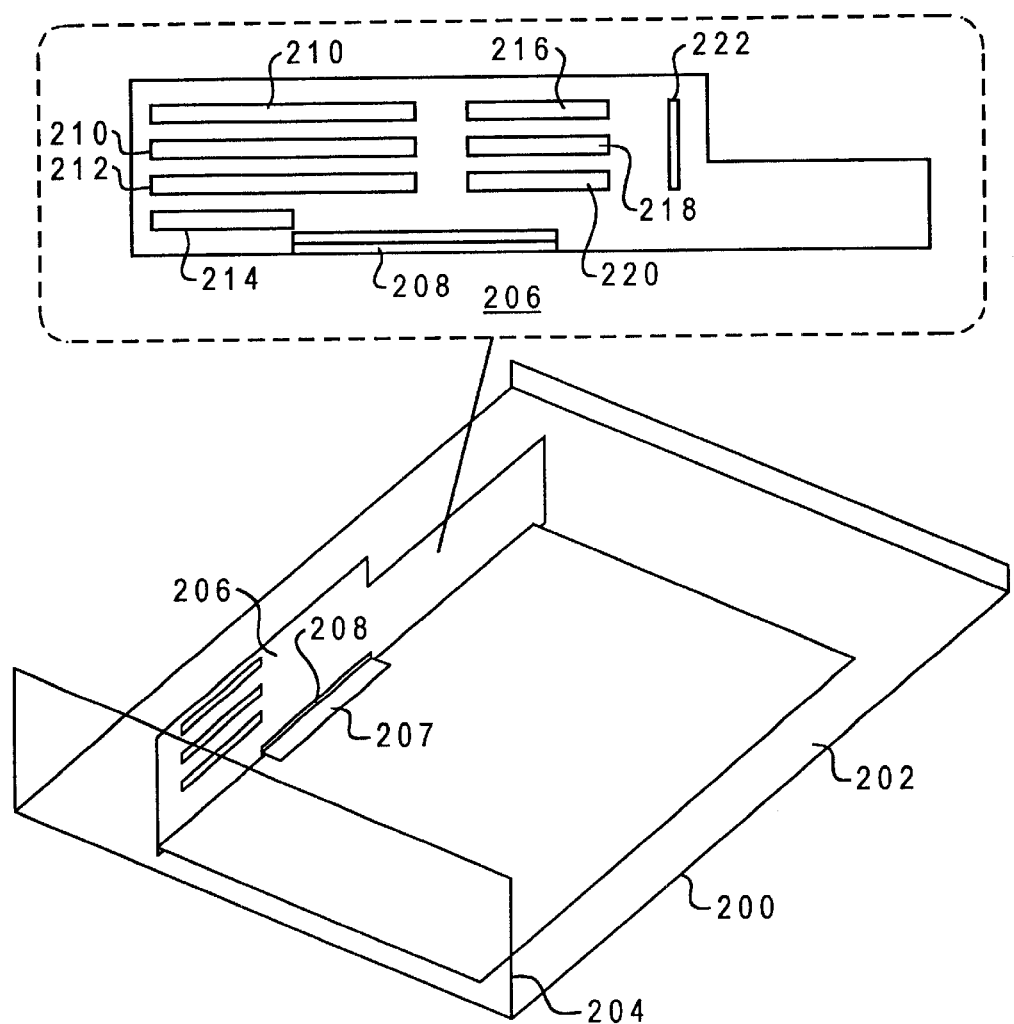
FIG. 2 depicts a high-level flow diagram of a method for designing, developing and producing NCs and PCs in the same group in accordance with a preferred embodiment of the present invention.

Referring now to FIG. 2, a high-level block diagram of a motherboard installed on a PC frame in accordance with a preferred embodiment of the present invention, is illustrated. Though an NLX form factor motherboard is depicted as the preferred embodiment, virtually any motherboard providing a connector for inserting (or connecting) a riser card is capable of being adapted for use in the present invention. Common frame 200 is shown and comprises motherboard 202, a chipset (not shown) and all associated circuitry (not shown). Front panel 204 typically contains indicator lights and switches connected by cabling to PC riser card 206. Riser card 206, as illustrated, depicts a typical riser card and is connected to motherboard 202 via connector slot 208 and connector 207.

A more detailed illustration of PC riser card 206 is shown and comprises multiple connector slots and connectors. Included on PC riser card 206 are motherboard edge connector 208, Peripheral Component Interconnect (PCI) bus connector slots 210, Industry Standard Architecture (ISA) 212 bus connector slots, audio connector header 214, primary Integrated Drive Electronics (IDE) 216 for hard drive, CDROM, etc., secondary IDE 218, floppy drive connector 220 and front panel connector 222.

Components and slots on a riser card varies depending on the computer in which the motherboard is installed. For instance, a NC riser card would require a slot for a compact flash card connector but no ISA connector and no primary IDE connector.

Figure 3:
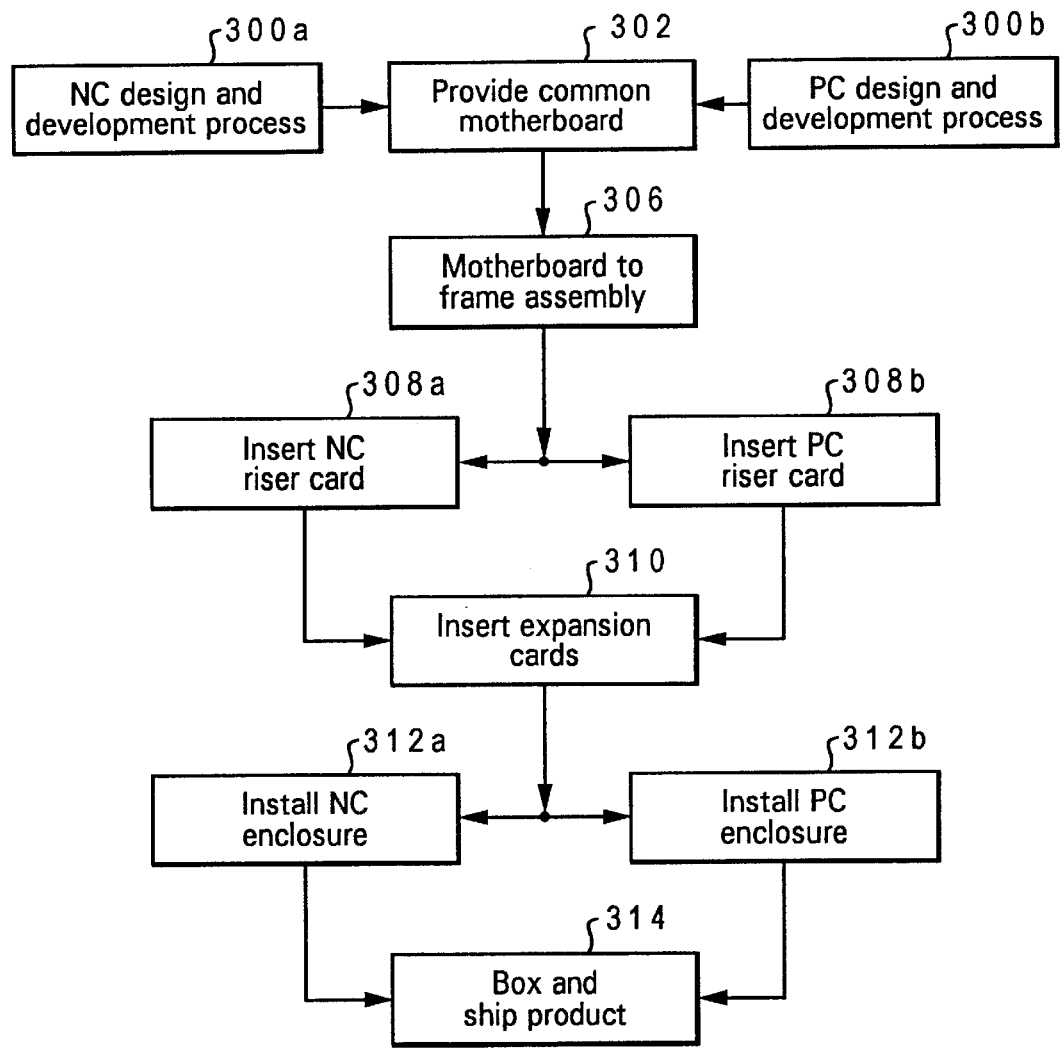
FIGS. 3 depicts a high-level block diagram of a motherboard installed on a frame in accordance with a preferred embodiment of the present invention.
Figure 4:
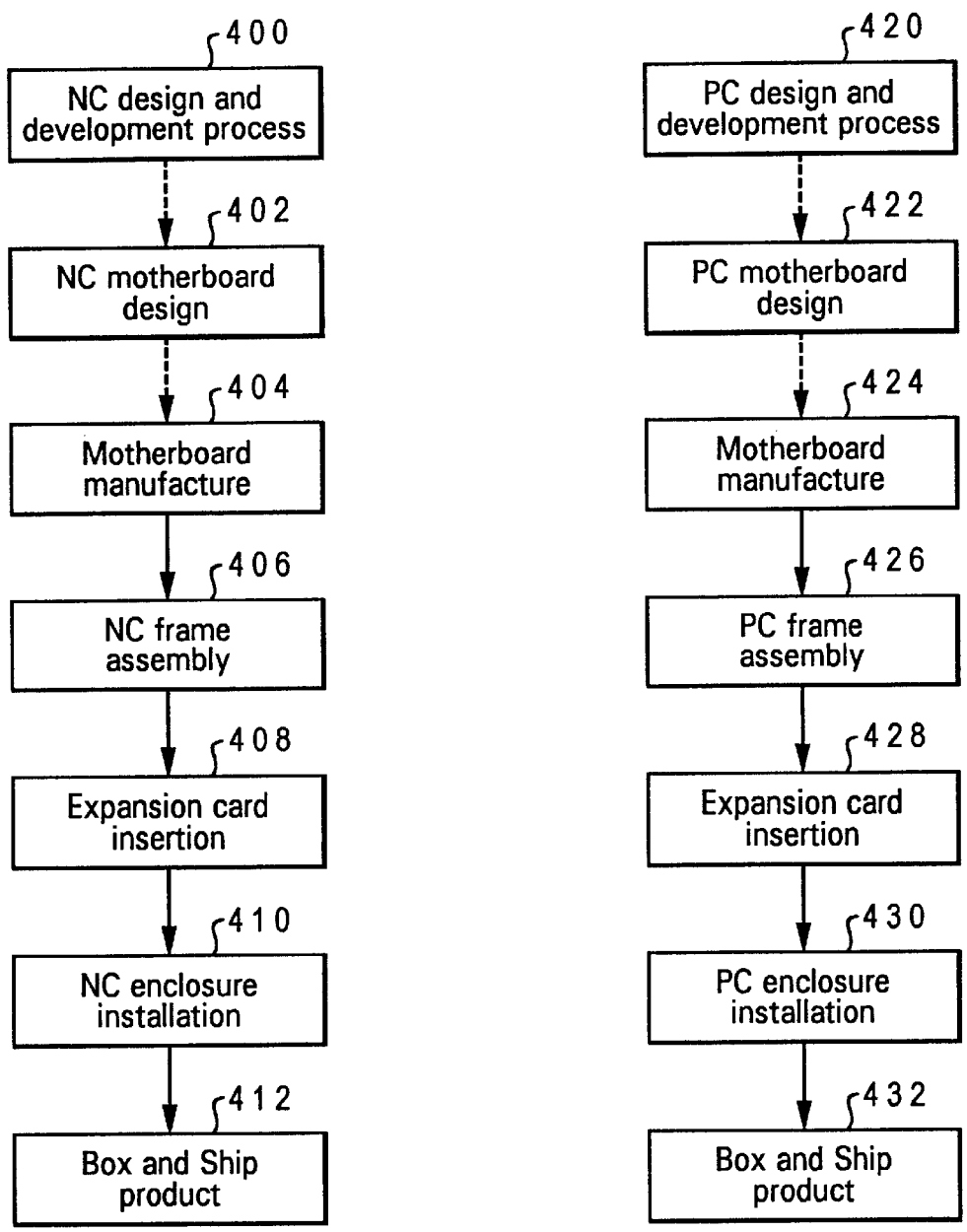
FIG. 4 is a high-level diagram of a representative method for designing, developing and producing NCs and PCs.

Referring now to FIG. 3, a high-level flow diagram of a method for designing, developing and producing NC and PC data processing systems in accordance with the present invention, is depicted. The process begins with step 300a and 300b, which depicts a concurrent design and development process of thin-client NC and PC systems. The process then proceeds to 302, which depicts providing a motherboard common to both a PC and a thin-client NC. The motherboard, which has a common microprocessor and provides a riser card connector, is designed to fit and mount on a frame.

The process continues to step 306, which depicts installing the common motherboard onto either a PC or a NC frame. Each frame type is configured to receive the common motherboard. The process then proceeds concurrently to step 308a and 308b, which illustrates installation of riser cards specific to the frame motherboard configuration. Literally, PC and NC frames with the common motherboard installed are moving down the same production line. As a PC frame, with motherboard installed, passes the riser card installation station, a PC riser card is installed (step 308b) into the riser card connector on the common motherboard. Also, if the frame requires a NC riser card, that card is installed into the motherboard at (step 308a) this step.

The process continues to step 310, which depicts installing predetermined NC or PC expansion cards into the riser card which is installed in the motherboard. Next, the process proceeds to step 312a and 312b, which illustrates installation of an upper enclosure specific to a PC or a NC frame. This upper enclosure is designed to fit the specific configuration of either the PC or the NC that is moving down the production line. The NC enclosure would have a low front profile similar to the enclosure depicted in FIG. 1B and the PC enclosure would resemble that in FIG. 1A. The PC enclosure may have a removable storage media bay, that when the media bay is removed the upper enclosure remaining would be a basic NC upper enclosure thereby providing additional material cost savings. The process then continues to step 314, which depicts boxing the computer and making ready for shipment.

A common development and production group for PC and NC systems saves time, labor and money. A commonly developed and produced motherboard is a basis for providing interchangeability between the PC and the NC system. A common motherboard provides cost savings and eliminates duplicate parts and materials, including chip sets. The savings on the common motherboard translates to savings on manufacturing as to mounting brackets, frames, connectors, etc. Manufacturing both systems on the same production line also saves on training, assembly jigs and manufacturing space.

While the invention has been particularly shown and described with reference to a preferred embodiment, it will be understood by those skilled in the art that various changes in form and detail may be made therein without departing from the spirit and scope of the invention.

What is claimed is:

1. A method for integrating design and assembly of thin-client computers and a Personal Computers, comprising the steps of:

providing a common motherboard having requisite processing functionality for both a thin-client computer and a Personal Computer to a common riser card installation means, wherein said common motherboard includes a thin-client riser card connector which accommodates connectivity to a thin-client riser card and, a Personal Computer riser card connector which accommodates connectivity to a Personal Computer riser card, said thin-client riser card including thin-client specific circuitry and components, and said Personal Computer riser card including Personal Computer specific components and peripheral device connector slots;

responsive to said riser card installation means determining that said common motherboard is to be installed in a thin-client computer, installing said thin-client riser card into said thin-client riser card connector; and responsive to said riser card installation means determining that said common motherboard is to be installed in a Personal Computer, installing said Personal Computer riser card into said Personal Computer riser card connector.

2. The method of claim 1, further comprising:

providing a microprocessor on said common motherboard capable of functioning with said thin-client and said Personal Computer specific circuitry and components.

3. The method of claim 1, wherein said thin-client riser card includes at least one expansion card slot.

4. The method of claim 1, wherein said producing a common motherboard further comprises providing a universal riser card connector on said common motherboard, wherein said universal riser card connector accommodates connectivity to both said thin-client riser card and said Personal Computer riser card.

5. The method of claim 1, further comprising:

responsive to said riser card installation means determining that said common motherboard is to be installed in a thin-client computer, installing said common motherboard within a thin-client computer frame; and responsive to said riser card installation means determining that said common motherboard is to be installed in a Personal Computer, installing said common motherboard within a Personal Computer frame.

6. The method of claim 1, wherein said Personal Computer specific peripheral device connector slots include one or more of a Peripheral Component Interconnect card, an Industry Standard Architecture card, and a storage media card.

7. The method of claim 5, wherein said thin-client computer frame and said Personal Computer frame are duplicative.

8. The method of claim 7, further comprising:

responsive to said installing said thin-client riser card into said thin-client riser card connector common motherboard within a thin-client computer frame, assembling said thin-client computer frame within a thin-client specific enclosure; and responsive to said installing said common motherboard within a Personal Computer computer frame, assembling said Personal Computer frame within a Personal Computer specific enclosure.

9. An apparatus for integrating design and assembly of thin-client computers and Personal Computers, comprising:

a common motherboard having requisite processing functionality for both a thin-client computer and a Personal Computer, wherein said common motherboard includes a thin-client riser card connector which accommodates connectivity to a thin-client riser card, and a Personal Computer riser card connector which accommodates connectivity to a Personal Computer riser card and said thin-client riser card including specific thin-client circuitry and components, said Personal Computer riser card including Personal Computer specific components and peripheral device connector slots;

a common riser card installation means, responsive to determining that said common motherboard is to be installed in a thin-client computer, for installing said thin-client riser card to said universal riser card connector, and further responsive to determining that said common motherboard is to be installed in a Personal Computer, for installing said Personal Computer riser card to said Personal Computer riser card connector.

10. The apparatus of claim 9, further comprising:

a microprocessor on said common motherboard capable of functioning with specific circuitry and components of said thin-client computer and said Personal Computer.

11. The apparatus of claim 9, wherein said thin-client riser card includes at least one expansion card slot.

12. The apparatus of claim 9, wherein said common motherboard further comprises a universal riser card connector that accommodates connectivity to both said thin-client riser card and said Personal Computer riser card.

13. The apparatus of claim 9, further comprising:

means responsive to said riser card installation means determining that said common motherboard is to be installed in a thin-client computer, for installing said common motherboard within a thin-client computer frame; and means responsive to said riser card installation means determining that said common motherboard is to be installed in a Personal Computer, for installing said common motherboard within a Personal Computer frame.

14. The apparatus of claim 9, wherein said Personal Computer specific peripheral device connector slots include one or more of a Peripheral Component Interconnect card, an Industry Standard Architecture card, and a storage media card.

15. The apparatus of claim 13, wherein said thin-client computer frame and said Personal Computer frame are duplicative.

* * * * *